(12) United States Patent
Kennedy

(10) Patent No.: US 7,540,507 B1
(45) Date of Patent: Jun. 2, 2009

(54) CHILD SEAT AND STROLLER ASSEMBLY

(76) Inventor: James M. Kennedy, 2750 Wilson Ct., Palm Harbor, FL (US) 34684

( * ) Notice: Subject to any disclaimer, the term of this patent is extended or adjusted under 35 U.S.C. 154(b) by 0 days.

(21) Appl. No.: 12/101,140

(22) Filed: Apr. 10, 2008

(51) Int. Cl.
*B62B 7/12* (2006.01)
(52) U.S. Cl. .......................................... 280/30; 280/648
(58) Field of Classification Search ................... 280/30, 280/648, 47.38; 297/130, 250.1
See application file for complete search history.

(56) References Cited

U.S. PATENT DOCUMENTS

| | | | | |
|---|---|---|---|---|
| 4,828,281 A | * | 5/1989 | Sanchas | 280/30 |
| 4,872,693 A | * | 10/1989 | Kennel | 280/30 |
| 4,874,182 A | * | 10/1989 | Clark | 280/30 |
| 4,902,026 A | * | 2/1990 | Maldonado | 280/30 |
| 4,989,888 A | * | 2/1991 | Qureshi et al. | 280/30 |
| 5,104,134 A | | 4/1992 | Cone | |
| 5,149,113 A | * | 9/1992 | Alldredge | 280/30 |
| D345,720 S | | 4/1994 | Pohl | |
| 5,398,951 A | * | 3/1995 | Ryu | 280/30 |
| 5,595,393 A | | 1/1997 | Batten | |
| 5,890,762 A | * | 4/1999 | Yoshida | 297/256.13 |
| 6,296,259 B1 | * | 10/2001 | Anderson | 280/30 |
| 6,367,821 B2 | | 4/2002 | Thiele | |
| 6,729,630 B2 | | 5/2004 | Szmidt et al. | |
| 6,854,744 B2 | | 2/2005 | Brandler | |
| 6,863,286 B2 | * | 3/2005 | Eros et al. | 280/47.38 |
| 2002/0060444 A1 | * | 5/2002 | Cote | 280/648 |

\* cited by examiner

*Primary Examiner*—Tony H. Winner

(57) ABSTRACT

A child seat and stroller assembly includes a base with a bottom wall and a perimeter wall. A chair includes a seat portion and a backrest portion that is attached to and extends upwardly from a rear edge of the seat portion. The seat portion is removably positioned in the base to prevent movement of the chair with respect to the base. A handle is attached to and extending upwardly from the chair. A wheel apparatus is mounted to the chair. The wheel apparatus includes a plurality of wheels positionable in a retracted position positioned above a bottom surface of the seat portion or in a deployed position extending below the bottom surface. The wheel apparatus is mechanically coupled to the handle. The wheel apparatus is alternately moved between the deployed and stored positions when the handle is actuated with respect to the chair.

7 Claims, 6 Drawing Sheets

CHILD SEAT AND STROLLER ASSEMBLY

BACKGROUND OF THE INVENTION

Field of the Invention

The present invention relates to child seat devices and more particularly pertains to a new child seat device for holding a child or an infant while riding in a vehicle and which can be converted to a stroller when removed from a vehicle.

SUMMARY OF THE INVENTION

The present invention meets the needs presented above by generally comprising a base that includes a bottom wall and a perimeter wall which is attached to and extends upwardly from the bottom wall. The perimeter wall has an upper edge. A chair includes a seat portion and a backrest portion that is attached to and extends upwardly from a rear edge of the seat portion. The seat portion is removably positioned in the base to prevent movement of the chair with respect to the base. A handle is attached to and extending upwardly from the chair. A wheel apparatus is mounted to the chair. The wheel apparatus includes a plurality of wheels positionable in a retracted position positioned above a bottom surface of the seat portion or in a deployed position extending below the bottom surface. The wheel apparatus is mechanically coupled to the handle. The wheel apparatus is alternately moved between the deployed position and the stored position when the handle is actuated with respect to the chair.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
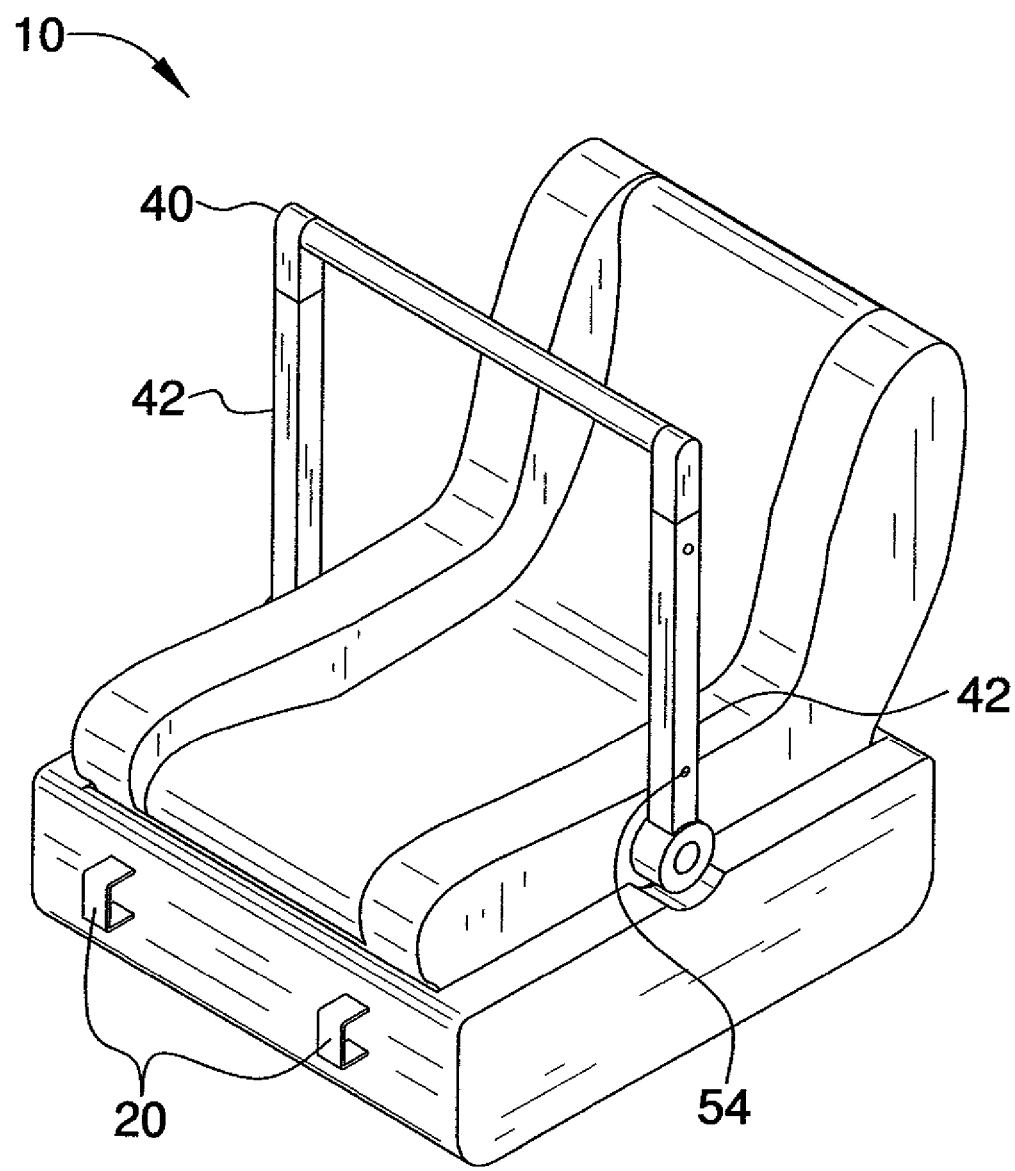
FIG. 1 is a front perspective view of a child seat and stroller assembly according to the present invention.
Figure 2:
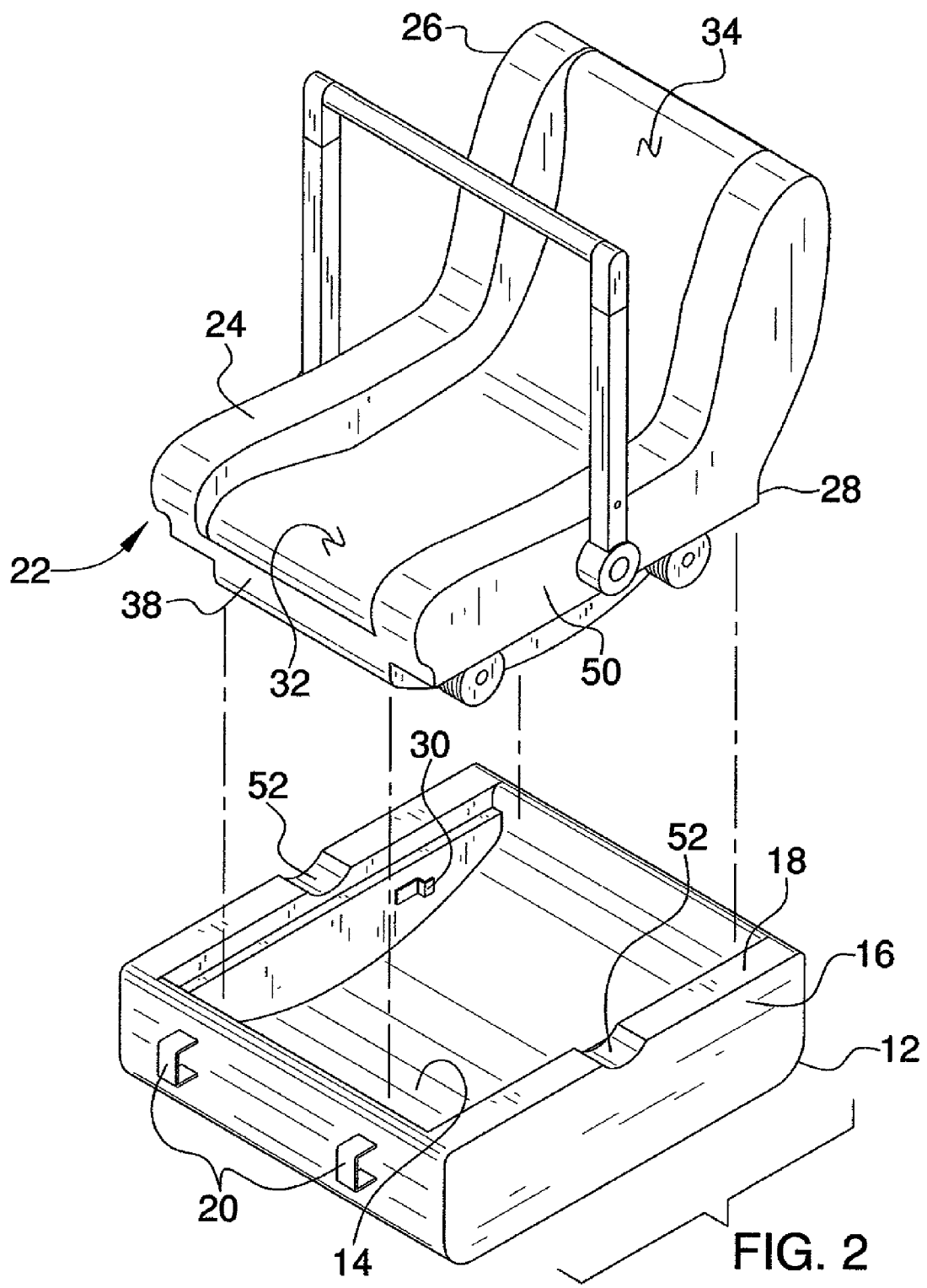
FIG. 2 is a front perspective view of the present invention.

With reference now to the drawings, and in particular to FIGS. 1 through 7 thereof, a new child seat device embodying the principles and concepts of the present invention and generally designated by the reference numeral 10 will be described.

As best illustrated in FIGS. 1 through 7, the child seat and stroller assembly 10 generally comprises a base 12 that includes bottom wall 14 and a perimeter wall 16 which is attached to and extends upwardly from the bottom wall 14. The perimeter wall 16 has an upper edge 18. The base 12 may be positioned in a vehicle and coupled to a vehicle seat with a seat belt attached to seat belt couplers 20 on the base 14 in a conventional manner used for child car seats.

A chair 22 includes a seat portion 24 and a backrest portion 26 that is attached to and extends upwardly from a rear edge 28 of the seat portion 26. The seat portion 26 is removably positioned in the base 12 to prevent movement of the chair 22 with respect to the base 12. A releasable catch 30 may be positioned in the base 12 to releasably secure the chair 22 in the base 12. The seat portion 24 has an upper side 32 adjoining a front side 34 of the backrest portion 26. The upper 32 and front 34 sides may include a cushioning material. The seat portion 24 has a lower side 36 that is convexly arcuate from a front edge 38 to the rear edge 28 of the seat portion 24. This allows the chair 22 to be used as a rocker for a child when it is not positioned in the base 12. The base 12 is contoured to match the bottom surface 36. The top surface 32 has an elongated depression therein extending from the front edge 38 to the backrest portion 26 to receive and cradle the child.

A handle 40 is attached to and extends upwardly from the chair 22. The handle 40 includes a pair of legs 42 each having an upper end 44 and a lower end 46. A central grip 48 is attached to and extends between the upper ends 44. The seat portion 24 has a pair of lateral sides 50. Each of the lateral sides 50 has one of the lower ends 46 rotatably coupled thereto. Each of the legs 42 is telescopic and has an adjustable height. The lower ends 46 extend into depressions 52 in the upper edge 18 of the perimeter wall 16 to help stabilize the chair 22 in the base 12. A locking detent 54 locks the legs at an extended height or a retracted height.

Figure 3:
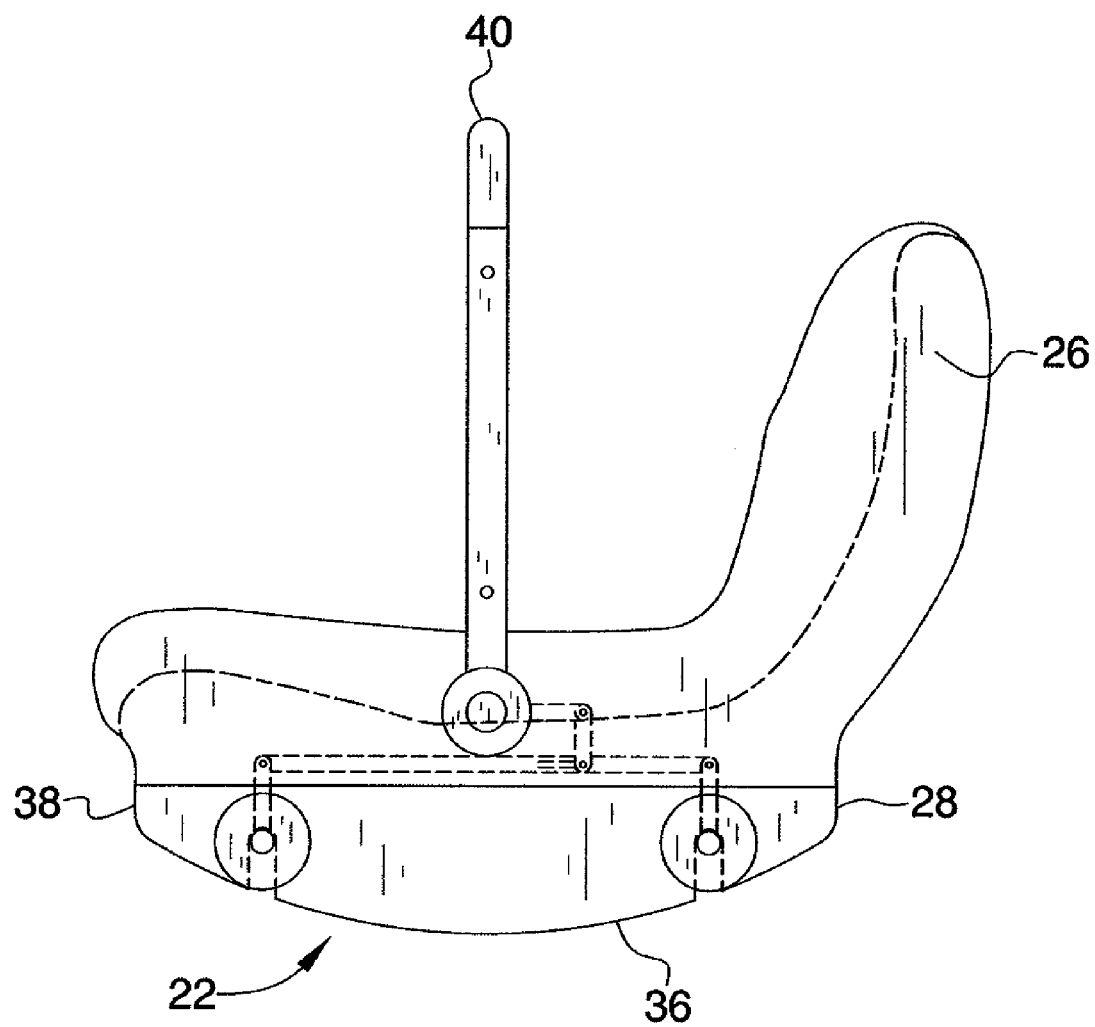
FIG. 3 is a right side view of a chair of the present invention.
Figure 4:
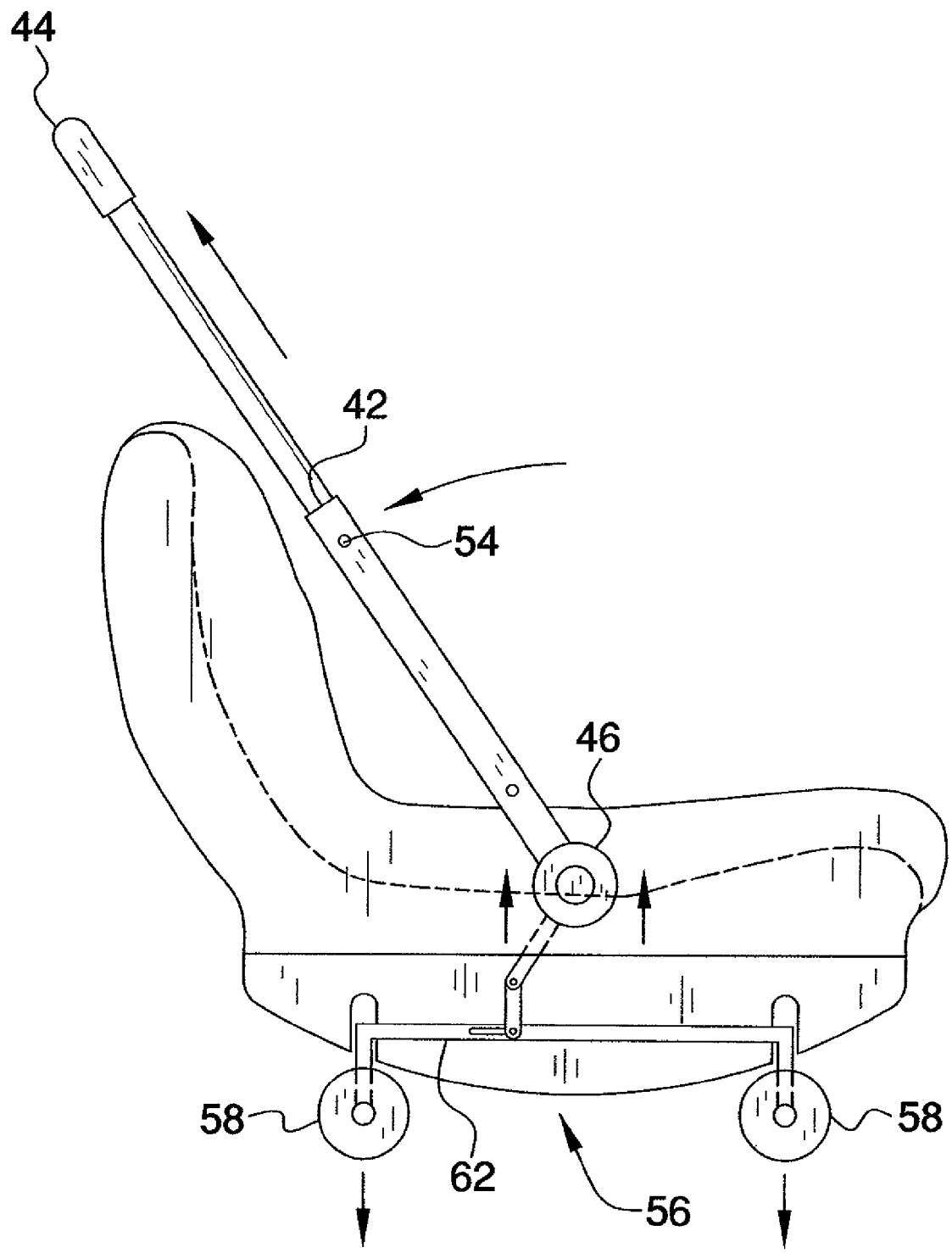
FIG. 4 is a left side view of the chair of the present invention.
Figure 5:
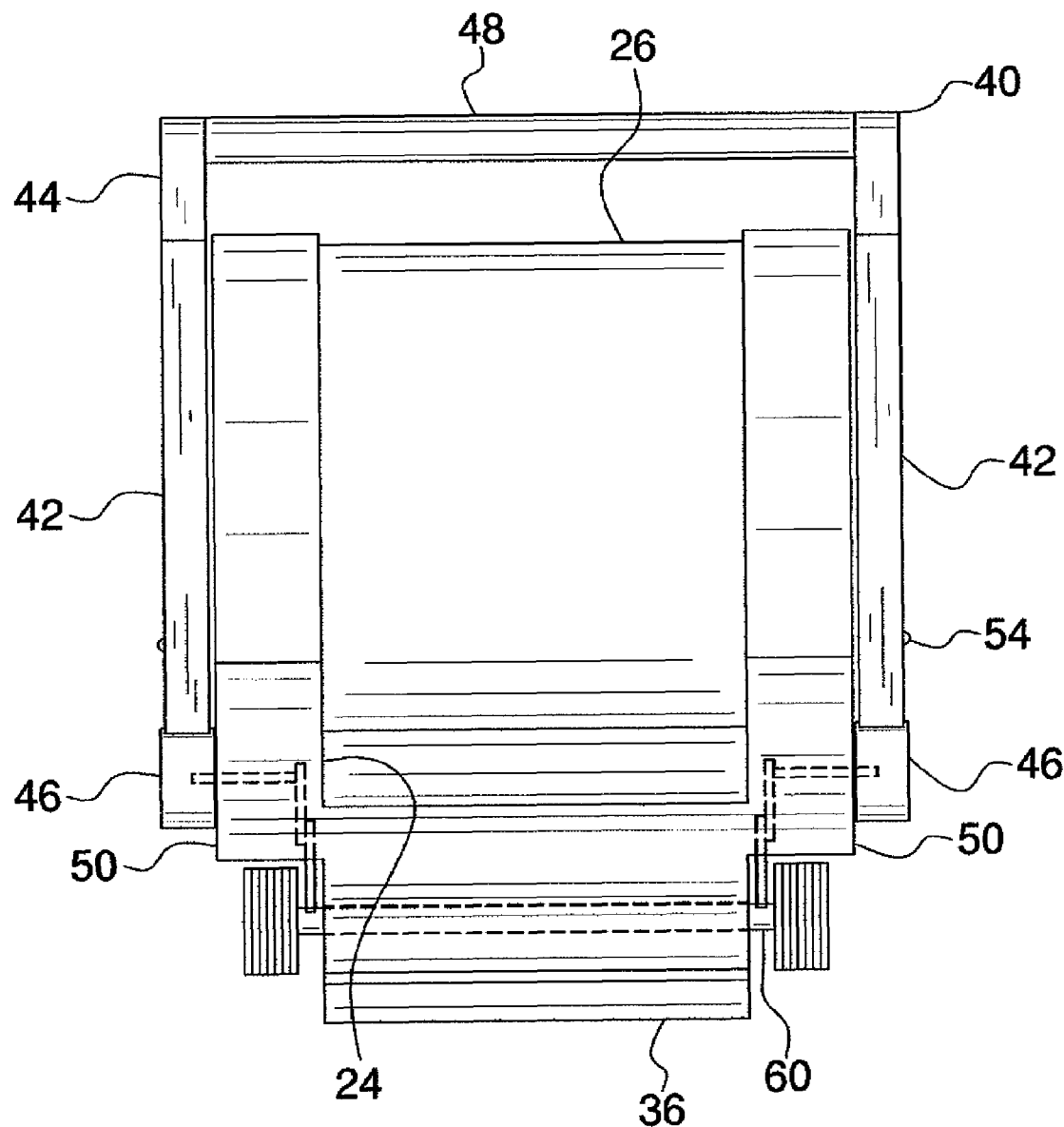
FIG. 5 is a front view of the chair of the present invention.
Figure 6:
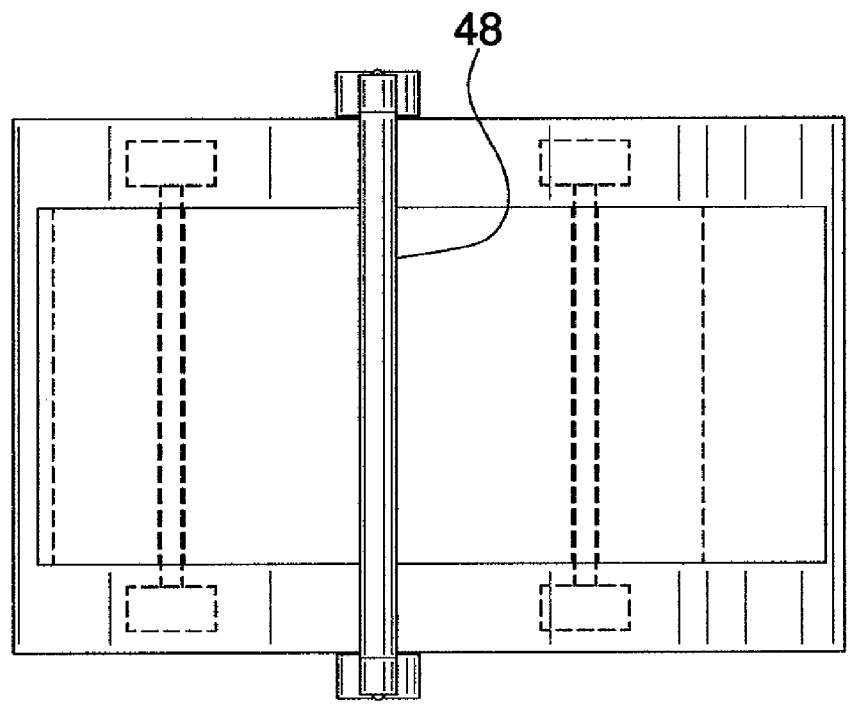
FIG. 6 is a top view of the chair of the present invention.
Figure 7:
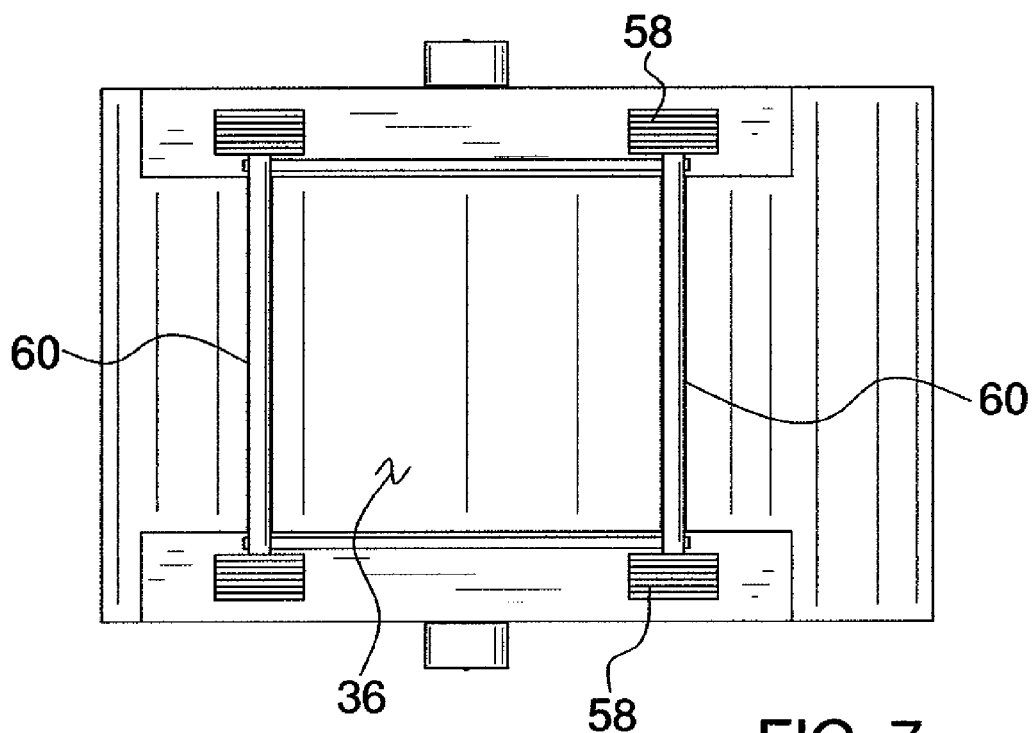
FIG. 7 is a bottom view of the chair of the present invention.

A wheel apparatus 56 is mounted to the chair 22. The wheel apparatus 56 includes a plurality of wheels 58 positionable in a retracted position positioned above the bottom surface 36 or in a deployed position extending below the bottom surface 36. The wheel apparatus 56 is mechanically coupled to the handle 40. The wheel apparatus 56 is alternately moved to the deployed position and to the stored position when this handle 40 is actuated with respect to the chair 12. This may be accomplished in a plurality of ways. One way may be as shown in FIGS. 3 and 4 wherein the wheel apparatus 56 is moved to the deployed position when the handle 40 is rotated forward of the backrest portion 26 and moved to the extended position when the handle 40 is rotated toward the backrest portion 24. The plurality of wheels 58 includes four wheels 58 coupled to two axles 60. Braces 62 extend between the axles 60 and are mechanically coupled to the legs 42 to be lifted or lowered with rotation of the legs 42.

Another means, not shown, of actuating the wheel apparatus 56 may include a structure that deploys the wheels 58 when the handle 40 is pulled out to its full length to the position in shown in FIG. 4 and retracts the wheels when the handle is retracted to the position shown in FIG. 1. Yet another means, not shown, may include the grip 48 being rotatably coupled to the legs 42 and mechanically coupled to the wheel apparatus 56 wherein rotation of the grip 48 deploys or retracts the wheel apparatus 56.

In use, the base 12 is attached to a vehicle seat in a conventional manner and the chair 22 may be positioned in the base 12 or removed when the base 12 is not needed. The wheel apparatus 56 is selectively deployed to allow the chair 22 to be used as a stroller apparatus. The convex curvature of the bottom surface 36 also allows the chair 22 to be used as a rocker for an infant positioned in the chair.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child seat and stroller combination assembly comprising:
   a base including a bottom wall and a perimeter wall being attached to and extending upwardly from said bottom wall, said perimeter wall having an upper edge;
   a chair including a seat portion and a backrest portion being attached to and extending upwardly from a rear edge of said seat portion, said seat portion being removably positioned in said base to prevent movement of said chair with respect to said base;
   a handle being attached to and extending upwardly from said chair; and
   a wheel apparatus being mounted to said chair, said wheel apparatus including a plurality of wheels being positionable in a retracted position locating above a bottom surface of said seat portion or in a deployed position extending below said bottom surface, said wheel apparatus being mechanically coupled to said handle, said wheel apparatus being alternately moved between said deployed position and said retracted position when said handle is actuated with respect to said chair.

2. The assembly according to claim 1, wherein said seat portion has an upper side adjoining a front side of said backrest portion, a top surface having an elongated depression therein extending from said front edge to said backrest portion, said elongated depression receiving a child.

3. The assembly according to claim 1, wherein said seat portion has a lower side, said lower side being convexly arcuate from a front edge to said rear edge of said seat portion.

4. The assembly according to claim 1, wherein said handle includes a pair of legs each having an upper end and a lower end, a central grip being attached to and extending between said upper ends, said seat portion having a pair of lateral sides, each of said lateral sides having one of said lower ends rotatably coupled thereto.

5. The assembly according to claim 4, wherein each of said legs is telescopic and has an adjustable height.

6. The assembly according to claim 5, wherein each of said lower ends extends into a depression in said upper edge of said perimeter wall.

7. A child seat and stroller combination assembly comprising:
   a base including a bottom wall and a perimeter wall being attached to and extending upwardly from said bottom wall, said perimeter wall having an upper edge;
   a chair including a seat portion and a backrest portion being attached to and extending upwardly from a rear edge of said seat portion, said seat portion being removably positioned in said base to prevent movement of said chair with respect to said base, said seat portion having an upper side adjoining a front side of said backrest portion, said seat portion having a lower side, said lower side being convexly arcuate from a front edge to said rear edge of said seat portion, a top surface having an elongated depression therein extending from said front edge to said backrest portion, said elongated depression receiving a child;
   a handle being attached to and extending upwardly from said chair, said handle including a pair of legs each having an upper end and a lower end, a central grip being attached to and extending between said upper ends, said seat portion having a pair of lateral sides, each of said lateral sides having one of said lower ends rotatably coupled thereto, each of said legs being telescopic and having an adjustable height, each of said lower ends extending into a depression in said upper edge of said perimeter wall; and
   a wheel apparatus being mounted to said chair, said wheel apparatus including a plurality of wheels being positionable in a retracted position locating above said bottom surface or in a deployed position extending below said bottom surface, said wheel apparatus being mechanically coupled to said handle, said wheel apparatus being alternately moved between said deployed position and said retracted position when said handle is actuated with respect to said chair.

* * * * *